United States Patent
Pratt et al.

(10) Patent No.: US 8,559,304 B2
(45) Date of Patent: Oct. 15, 2013

(54) SYSTEM AND METHOD FOR CONTROLLING STREAMING CONTENT IN A CELLULAR TELEPHONE

(75) Inventors: James Pratt, Round Rock, TX (US); Marc A. Sullivan, Austin, TX (US); Steven M. Belz, Cedar Park, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 165 days.

(21) Appl. No.: 12/333,836

(22) Filed: Dec. 12, 2008

(65) Prior Publication Data

US 2010/0149982 A1    Jun. 17, 2010

(51) Int. Cl.
    *H04L 1/00* (2006.01)
(52) U.S. Cl.
    USPC ......... 370/230; 370/255; 370/345; 455/432.3
(58) Field of Classification Search
    None
    See application file for complete search history.

(56) References Cited

U.S. PATENT DOCUMENTS

| | | | |
|---|---|---|---|
| 2003/0147369 A1* | 8/2003 | Singh et al. | 370/338 |
| 2004/0048613 A1 | 3/2004 | Sayers et al. | |
| 2006/0022801 A1* | 2/2006 | Husak et al. | 340/10.5 |
| 2006/0142013 A1 | 6/2006 | Sayers et al. | |
| 2006/0265747 A1* | 11/2006 | Judge | 726/22 |
| 2007/0086437 A1 | 4/2007 | DiFazio et al. | |
| 2007/0112786 A1 | 5/2007 | Shin et al. | |
| 2007/0124785 A1 | 5/2007 | Marsico | |
| 2008/0013524 A1 | 1/2008 | Hwang et al. | |
| 2008/0076410 A1 | 3/2008 | Beyer | |
| 2009/0133090 A1* | 5/2009 | Busse | 725/132 |
| 2009/0143057 A1* | 6/2009 | Arun et al. | 455/418 |

OTHER PUBLICATIONS

"AT&T Smart Limits for Wireless," Product Information, Nov. 11, 2008, http://www.wireless.att.com/learn/articles-resources/parental-controls/smart-limits.jsp.

* cited by examiner

*Primary Examiner* — Jianye Wu
(74) *Attorney, Agent, or Firm* — Guntin & Gust, PLC; Ed Guntin

(57) ABSTRACT

A method includes receiving a plurality of control parameters at a first mobile communications device, and storing the control parameters in a memory of the first mobile communications device. The method also includes setting a plurality of first Internet Protocol data flow restrictions for a respective plurality of ports first of the first mobile communications device based on the settings in the memory. A device for implementing the method is also disclosed.

19 Claims, 4 Drawing Sheets

SYSTEM AND METHOD FOR CONTROLLING STREAMING CONTENT IN A CELLULAR TELEPHONE

FIELD OF THE DISCLOSURE

The present disclosure generally relates to communications networks, and more particularly relates to a system and method for controlling streaming content in a cellular telephone.

BACKGROUND

Many cellular telephones have the ability to take pictures and to record video using a built-in camera. Some of these cellular telephones can then transmit the images to other devices, such as personal computers or other cellular telephones, connected to a network such as the Internet or a cellular network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
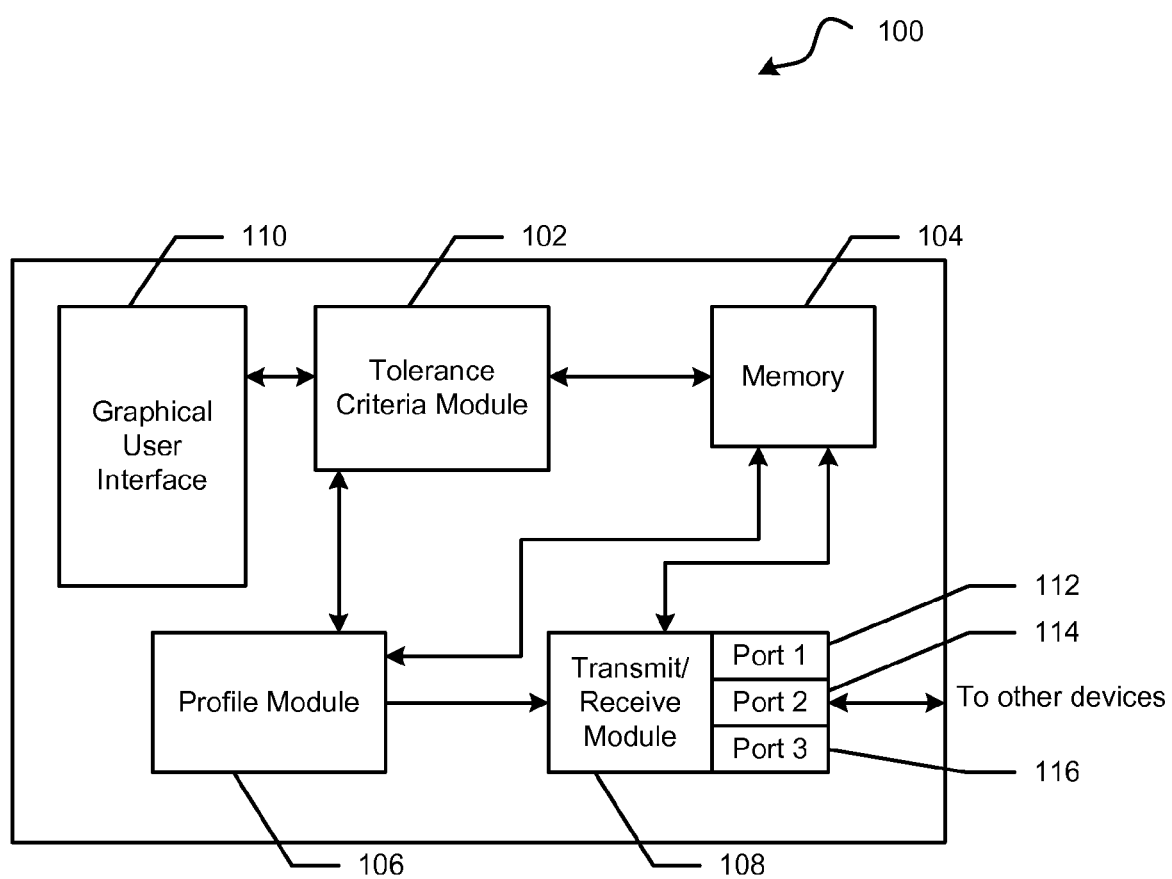
FIG. 1 is a block diagram of a mobile communications device.

FIG. 1 shows a mobile communications device 100 such as a cellular telephone that includes a tolerance criteria module 102, a memory 104, a profile module 106, a transmit/receive module 108, and a graphical user interface (GUI) 110. The tolerance criteria module 102 is in communication with the memory 104, with the profile module 106, and with the GUI 110. The memory 104 is in communication with the profile module 106 and with the transmit/receive module 108, which in turn communicates with other devices. The profile module 106 is in communication with the transmit/receive module 108, which includes a first Internet Protocol (IP) port 112, a second IP port 114, and a third IP port 116.

The tolerance criteria module 102 can receive user inputs from the GUI 110 for control parameters associated with the cellular telephone 100 transmitting and receiving data packets, such as IP traffic. The control parameters can include a type of data to block or accept, a time of day to block or accept the data, a user profile for the control parameters, and the like. The type of data can be streaming videos, pictures, short message service (SMS) text messages, and the like.

After receiving the control parameters, the tolerance criteria module 102 can store the control parameters in the memory 104, and can also send the control parameters to the profile module 106. The tolerance criteria module 102 can also add, remove, and/or change the control parameters that are stored in the memory 104. The profile module 106 can assign the control parameters to different user profiles, such that different user profiles can receive and/or transmit different IP traffic at different times of the day. Based on the control parameters received from the tolerance criteria module 102, the profile module 106 can set different IP data flow restrictions for different IP ports in the transmit/receive module 108, such as the first IP port 112, the second IP port 114, and the third IP port 116. The IP data flow restrictions can set acceptable and/or unacceptable content for each IP port based on a packet size of the content, volume of the content, the time of day, and the IP port that the content is assigned. The profile module 106 can send the IP data flow restrictions to the transmit/receive module 108 so that the IP traffic through the transmit/receive module 108 can be controlled based on the IP data flow restrictions.

For example, the tolerance criteria module 102 can receive control parameters that streaming video, pictures, and SMS text messages should not be sent or received by the cellular telephone 100 between ten in the evening and seven in the morning. The tolerance criteria module 102 can store the control parameters in the memory 104, and can send the control parameters to the profile module 106. In another embodiment, the profile module 106 can retrieve the control parameters from the memory 104 without first receiving them from the tolerance criteria module 102. Based on the control parameters, the profile module 106 can set IP data flow restrictions for the cellular telephone 100. The IP data flow restrictions can prevent the flow of IP traffic through the second IP port 114 and the third IP port 116 each assigned to streaming video, SMS text messaging, and pictures. Additionally, the IP data flow restrictions can prevent the flow of IP traffic larger than a specific size through the first IP port 112 assigned to electronic mail (email) messages.

The specific size of IP traffic for the first IP port 112 assigned to electronic mail messages can be set such that if videos and/or pictures are attached to an email message, the size of the email is above the specific size. Thus, the data flow restrictions can allow emails that are below the specific size and block the emails that are above the specific size, which can indicate that a video or picture is attached to the email. Thus, the transmit/receive module 108 can assume that if the IP traffic is larger than a specific size, then the IP traffic is streaming video and/or pictures. Alternatively, the profile module 106 can prevent transmission or reception of any IP traffic assigned to any of the IP ports 112, 114, and 116 if the IP traffic is above the specific size. After the IP data flow restrictions are set by the profile module 106, the profile module can send the data flow restrictions to the memory 104 and to the transmit/receive module 108. Based on the data flow restrictions, the transmit/receive module 108 can control the IP traffic assigned to the associated IP ports 112, 114, and 116 so that the control parameters set by the user are met.

The profile module 106 can assign and store the IP data flow restrictions to different user profiles. The different user profiles can then be sent to different cellular telephones associated with the same service account as the cellular telephone 100 via the transmit/receive module 108. For example, if a parent has a number of phones on the same account, such as a family plan, the parent can use his or her cellular phone to select control parameters for the other cellular telephones on the same account. After the control parameters are set, the profile module 106 can set the IP data flow restrictions for each user profile and transmit the user profile to the associated cellular telephone via the transmit/receive module 108. After receiving the user profile, the cellular telephone associated with the user profile can implement the user profile through its own profile module and transmit/receive module. Additionally, the different user profiles can be stored and implemented on the same cellular telephone so that if more than one person uses the cellular telephone different IP data flow restrictions can be set. For example, if a parent allows a child to use his or her cellular telephone, the parent can set one user profile of control parameters for himself and another user profile of control parameters for the child. The parent can then use the GUI 110 to select one of the user profiles before using the cellular telephone, and/or before allowing the child to use the cellular telephone.

Additionally, the user profiles and IP data flow restrictions can be set through an online account, and then sent to the different cellular telephones to be implemented. Therefore, the online account can be used to set one user profile without any IP data flow restrictions, and to set another user profile with content and time of day IP data flow restrictions. It should be understood that the modules can be implemented in hardware, software, and/or any combination of hardware and software.

Figure 2:
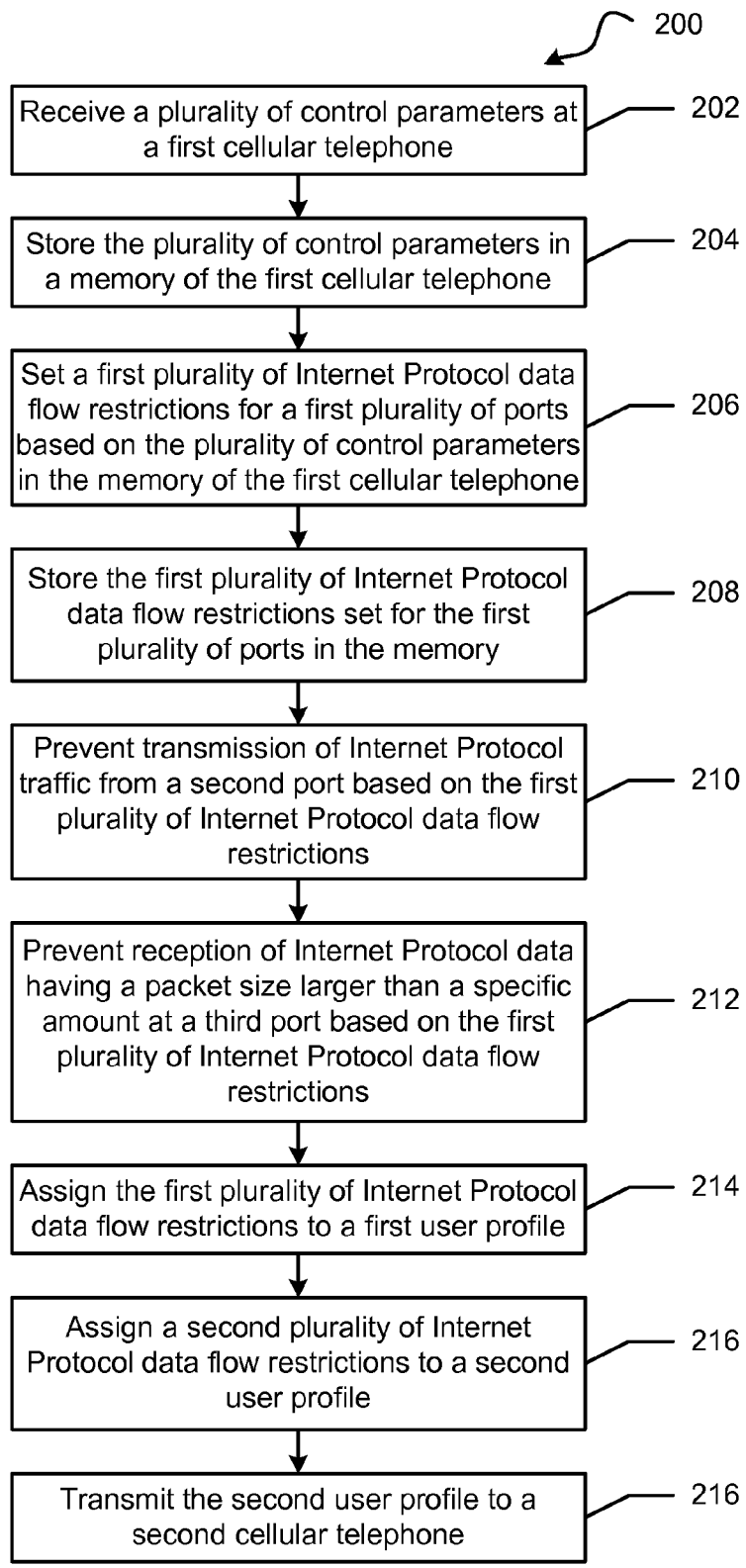
FIG. 2 is a flow diagram of a method for setting Internet Protocol data flow restrictions for the mobile communications device of FIG. 1.

FIG. 2 shows a method 200 for setting Internet Protocol data flow restrictions for the cellular telephone 100. At block 202, a plurality of control parameters are received at a first cellular telephone. The plurality of control parameters is stored in a memory of the first cellular telephone at block 204. At block 206, a first plurality of Internet Protocol data flow restrictions is set for a first plurality of Internet protocol ports based on the plurality of control parameters in the memory of the first cellular telephone. The first plurality of Internet Protocol data flow restrictions set for the first plurality of Internet Protocol ports is stored in the memory at block 208.

At block 210, transmission of Internet Protocol traffic from a second port is prevented based on the first plurality of Internet Protocol data flow restrictions. Reception of Internet Protocol data having a packet size larger than a specific threshold is prevented at a third Internet Protocol port based on the first plurality of Internet Protocol data flow restrictions at block 212. At block 214, the first plurality of Internet Protocol data flow restrictions is assigned to a first user profile. A second plurality of Internet Protocol data flow restriction is assigned to a second user profile at block 216. At block 218, the second user profile is transmitted to a second cellular telephone.

Figure 3:
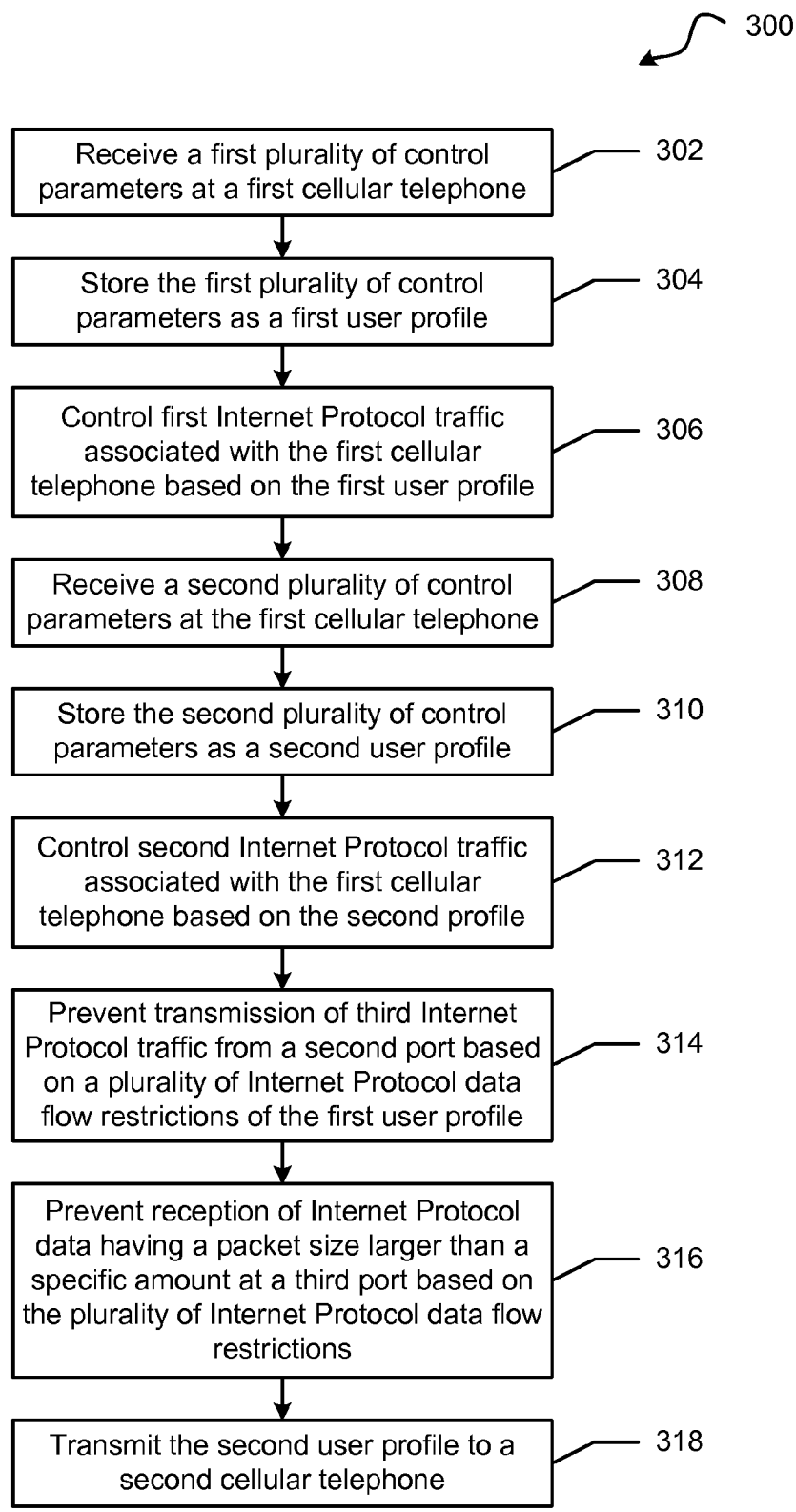
FIG. 3 is a flow diagram of an alternative method for setting Internet Protocol data flow restrictions for the mobile communications device.

FIG. 3 shows an alternative method 300 for setting Internet Protocol data flow restrictions for the cellular telephone 100. At block 302, a first plurality of control parameters is received at a first cellular telephone. The plurality of control parameters is stored as a first user profile at block 304. At block 306, first Internet Protocol traffic associated with the first cellular telephone is controlled based on the first user profile. A second plurality of control parameters is received at the first cellular telephone at block 308. At block 310, the second plurality of control parameters is stored as a second user profile. Second Internet Protocol traffic associated with the first cellular telephone is controlled based on the second profile at block 312.

At block 314, transmission of third Internet Protocol traffic from a second port is prevented based on a plurality of Internet Protocol data flow restrictions of the first user profile. Reception of Internet Protocol data having a packet size larger than a specific threshold is prevented at a third Internet Protocol port based on the plurality of Internet Protocol data flow restrictions at block 316. At block 318, the second user profile is transmitted to a second cellular telephone.

Figure 4:
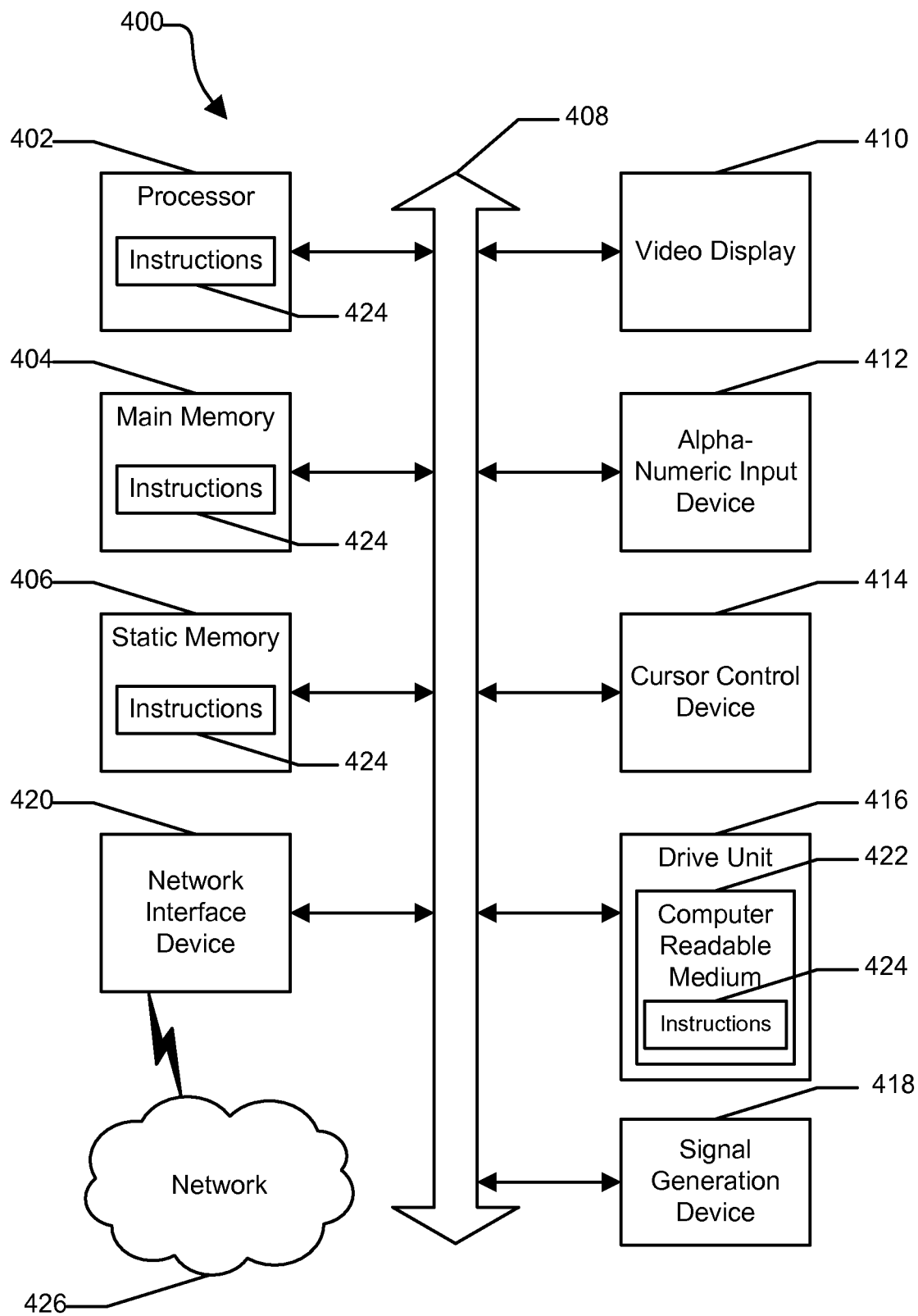
FIG. 4 is a block diagram of a general computer system.

FIG. 4 shows an illustrative embodiment of a general computer system 400 in accordance with at least one embodiment of the present disclosure. The computer system 400 can include a set of instructions that can be executed to cause the computer system to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:

receiving, by a first cellular phone device, control parameters and data packets comprising internet protocol traffic data over the air;

storing, by the first cellular phone device, the control parameters in a memory of the first cellular phone device, wherein the control parameters specify a type of data packet to block or accept, a time of day to block or accept, and a type of data among streaming videos, pictures, or short messaging service data, wherein the control parameters that specify the time of day to block or accept include a specified period of time during the day in which receiving and transmitting of internet protocol traffic is exclusively permitted, wherein outside of the specified period of time during the day the receiving and transmitting of the internet protocol traffic is prohibited;

setting, by the first cellular phone device, first internet protocol data flow restrictions to generate settings for a respective plurality of first software ports of the first cellular phone device based on the control parameters;

storing, by the first cellular phone device, the settings in the memory;

preventing, by the first cellular phone device, transmission of the internet protocol traffic from a second software port of the first cellular phone device, wherein the first internet protocol data flow restrictions are based on a packet size of content and a volume of the content, wherein the content is assigned to an internet protocol port of the first cellular phone device;

assigning, by the first cellular phone device, the first internet protocol data flow restrictions to a first user profile;

assigning, by the first cellular phone device, second internet protocol data flow restrictions to a second user profile; and transmitting the second user profile to a second cellular phone device.

2. The method of claim 1 further comprising:
preventing, by the first cellular phone device, reception of internet protocol data having a packet size larger than a specific amount at a third software port based on the first internet protocol data flow restrictions.

3. The method of claim 2, wherein the second software port is a streaming video port, and the third software port is an electronic mail port and further comprising presenting, by the first cellular phone device, a graphical user interface that requires selection of a user profile from among the first and second user profiles prior to enabling services on the first cellular phone device.

4. The method of claim 1 wherein the first and second user profiles include different specified periods of time during the day in which the receiving and transmitting of the internet protocol traffic is exclusively permitted.

5. The method of claim 1 wherein receiving the control parameters comprises:
receiving, by the first cellular phone device, the control parameters from a user interface of the first cellular phone device.

6. A method comprising:
receiving, by a first cellular phone device, first control parameters and data packets comprising internet protocol traffic data over the air;
storing, by the first cellular phone device, the first control parameters;
controlling, by the first cellular phone device, first internet protocol traffic received by and transmitted from the first cellular phone device based on a first user profile;
receiving, by the first cellular phone device, second control parameters;
storing, by the first cellular phone device, the second control parameters, wherein the first control parameter and the second control parameters specify a type of data packet to block or accept and a time of day to block or accept, wherein the type of data packets are among streamed videos, pictures, and short message service data, wherein the time of day to block or accept comprises a specified period of time during the day in which receiving and transmitting of internet protocol traffic is exclusively permitted, wherein outside of the specified period of time during the day the receiving and transmitting of the internet protocol traffic is prohibited;
controlling, by the first cellular phone device, second internet protocol traffic received by and transmitted from the first cellular phone device based on a second user profile;
preventing, by the first cellular phone device, transmission of third Internet Protocol traffic from a first software port based on-Internet Protocol data flow restrictions of the first user profile, wherein the internet protocol data flow restrictions are based on at least one of a packet size of content and a volume of the content;
assigning, by the first cellular phone device, the second control parameters to the second user profile; and
transmitting the second user profile to a second cellular phone device.

7. The method of claim 6 further comprising:
preventing, by the first cellular phone device, reception of internet protocol data having a packet size larger than a specific amount at a second software port based on the Internet Protocol data flow restrictions.

8. The method of claim 7 wherein the first software port is a streaming video port, and the second software port is an electronic mail port.

9. The method of claim 6 wherein the first and second user profiles include different specified periods of time during the day in which the receiving and transmitting of the internet protocol traffic is exclusively permitted.

10. The method of claim 6 further comprising:
assigning, by the first cellular phone device, the first control parameters to the first user profile.

11. A cellular telephone comprising:
a tolerance criteria module configured to receive control parameters at the cellular telephone, and further configured to store the control parameters in a memory of the cellular telephone, wherein the control parameters specify a type of data packet to block or accept, a time of day to block or accept, and a type of data among streaming videos, pictures, or short messaging service data, wherein the control parameters that specify the time of day to block or accept include a specified period of time during the day in which receiving and transmitting of internet protocol traffic is exclusively permitted, wherein outside of the specified period of time during the day the receiving and transmitting of the internet protocol traffic is prohibited;
a profile module configured to set first internet protocol data flow restrictions for a respective plurality of first software ports of the cellular telephone based on the control parameters, and further configured to store settings for the first internet protocol data flow restrictions in the memory, wherein the first internet protocol data flow restrictions for the respective plurality of first software ports of the cellular telephone include controlling internet protocol data that is transmitted from and received by the cellular telephone, wherein the first internet protocol data flow restrictions are based on a packet size of content and a volume of the content, wherein the content is assigned to an internet protocol port of the cellular telephone;
a memory storing computer instructions; and
a processor coupled to the memory, wherein the processor, responsive to executing the computer instructions, performs operations comprising:
assigning the first internet protocol data flow restrictions to a first user profile;
assigning second internet protocol data flow restrictions to a second user profile; and
transmitting the second user profile to a second cellular telephone.

12. The cellular telephone of claim 11 further comprising:
a transmit/receive module in communication with the profile module, the transmit/receive module configured to prevent transmission of internet protocol traffic from a second software port based on the first internet protocol data flow restrictions, and further configured to prevent reception of internet protocol data having a packet size larger than a specific amount at a third software port based on the first internet protocol data flow restrictions.

13. The cellular telephone of claim 12 wherein the second software port is a streaming video internet protocol port, and the third software port is an electronic mail internet protocol port.

14. The cellular telephone of claim 11 wherein the first and second user profiles include different specified periods of time during the day in which the receiving and transmitting of the internet protocol traffic is exclusively permitted.

15. The cellular telephone of claim 11 wherein the profile module is further configured to assign the first internet protocol data flow restrictions to a first user profile, and to assign a plurality of second internet protocol data flow restrictions to a second user profile.

16. A non-transitory computer readable medium comprising a plurality of instructions which when executed by a processor cause the processor to perform operations comprising:

receiving control parameters and data packets comprising internet protocol traffic data over the air at a first cellular telephone;

storing the control parameters in a memory of the first cellular telephone, wherein the control parameters specify a type of data packet to block or accept, a time of day to block or accept, and a type of data among streaming videos, pictures, or short messaging service data, wherein the control parameters that specify the time of day to block or accept includes a specified period of time during the day in which receiving and transmitting of internet protocol traffic is exclusively permitted, wherein outside of the specified period of time during the day the receiving and transmitting of the internet protocol traffic is prohibited;

setting first internet protocol data flow restrictions for a respective plurality of first software ports of the first cellular telephone based on the control parameters;

storing the first internet protocol data flow restrictions set for the first software ports in the memory;

controlling internet protocol traffic received by and transmitted from the first cellular telephone based on the first internet protocol data flow restrictions, wherein the first internet protocol data flow restrictions are based on a packet size of content and a volume of the content, wherein the content is assigned to an internet protocol port of the first cellular telephone;

assigning the first internet protocol data flow restrictions to a first user profile;

assigning second internet protocol data flow restrictions to a second user profile; and transmitting the second user profile to a second cellular phone.

17. The non-transitory computer readable medium of claim 16 further comprising computer instructions which when executed by the processor cause the processor to perform operations comprising:

preventing transmission of internet protocol traffic from a second software port based on the first internet protocol data flow restrictions; and preventing reception of internet protocol data having a packet size larger than a specific amount at a third software port based on the first internet protocol data flow restrictions.

18. The non-transitory computer readable medium of claim 17 wherein the second software port is a streaming video port, and the third software port is an electronic mail port.

19. The non-transitory computer readable medium of claim 16 wherein the first and second user profiles include different specified periods of time during the day in which the receiving and transmitting of the internet protocol traffic is exclusively permitted.

* * * * *